US011996086B2

(12) United States Patent
Tawara et al.

(10) Patent No.: US 11,996,086 B2
(45) Date of Patent: May 28, 2024

(54) ESTIMATION DEVICE, ESTIMATION METHOD, AND ESTIMATION PROGRAM

(71) Applicant: NIPPON TELEGRAPH AND TELEPHONE CORPORATION, Tokyo (JP)

(72) Inventors: Naohiro Tawara, Tokyo (JP); Hosana Kamiyama, Tokyo (JP); Satoshi Kobashikawa, Tokyo (JP); Atsunori Ogawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 283 days.

(21) Appl. No.: 17/636,826

(22) PCT Filed: Aug. 19, 2019

(86) PCT No.: PCT/JP2019/032271
§ 371 (c)(1),
(2) Date: Feb. 18, 2022

(87) PCT Pub. No.: WO2021/033233
PCT Pub. Date: Feb. 25, 2021

(65) Prior Publication Data
US 2022/0335928 A1 Oct. 20, 2022

(51) Int. Cl.
*G10L 15/08* (2006.01)
*G10L 17/02* (2013.01)
(Continued)

(52) U.S. Cl.
CPC .............. *G10L 15/08* (2013.01); *G10L 17/02* (2013.01); *G10L 17/04* (2013.01); *G10L 17/08* (2013.01); *G10L 17/18* (2013.01); *G10L 17/26* (2013.01)

(58) Field of Classification Search
CPC ......... G10L 15/08; G10L 17/02; G10L 17/04; G10L 17/08; G10L 17/18; G10L 17/26
(Continued)

(56) References Cited

U.S. PATENT DOCUMENTS 7,707,028 B2 * 4/2010 Kojima ................. G10L 15/197
704/9
9,269,347 B2 * 2/2016 Latorre-Martinez ........................
G10L 13/033
(Continued)

FOREIGN PATENT DOCUMENTS

CN 101042868 A * 9/2007 ......... G06F 17/2785
CN 101042868 B * 6/2012 ......... G06F 17/2785
(Continued)

OTHER PUBLICATIONS

Ghahremani et al. (2018) "End-to-End Deep Neural Network Age Estimation" Interspeech, Sep. 2, 2018, pp. 277-281.

*Primary Examiner* — Edwin S Leland, III

(57) ABSTRACT

An estimation apparatus clusters a group of voice signals including a voice signal having a speaker attribute to be estimated into a plurality of clusters. Subsequently, the estimation apparatus identifies, from the plurality of clusters, a cluster to which the voice signal to be estimated belongs. Next, the estimation apparatus uses a speaker attribute estimation model to estimate speaker attributes of respective voice signals in the identified cluster. After that, the estimation apparatus estimates an attribute of the entire cluster, by using an estimation result of the speaker attributes of the voice signals in the identified cluster, and outputs an estimation result of the speaker attribute of the entire cluster, as an estimation result of the speaker attribute of the voice signal to be estimated.

11 Claims, 7 Drawing Sheets

(51) Int. Cl.
*G10L 17/04* (2013.01)
*G10L 17/08* (2013.01)
*G10L 17/18* (2013.01)
*G10L 17/26* (2013.01)

(58) Field of Classification Search
USPC .......................................................... 704/200
See application file for complete search history.

(56) References Cited

U.S. PATENT DOCUMENTS

| | | | |
|---|---|---|---|
| 2007/0219779 A1* | 9/2007 | Kojima | G06F 40/30 |
| | | | 704/9 |
| 2013/0262119 A1* | 10/2013 | Latorre-Martinez | G10L 13/08 |
| | | | 704/260 |
| 2022/0335928 A1* | 10/2022 | Tawara | G10L 15/08 |

FOREIGN PATENT DOCUMENTS

| | | | | |
|---|---|---|---|---|
| CN | 104424943 A | * | 3/2015 | ............. G10L 13/02 |
| CN | 107978311 A | * | 5/2018 | ............. G10L 15/02 |
| CN | 108364639 A | * | 8/2018 | ............. G10L 13/02 |
| CN | 109637547 A | * | 4/2019 | ........... G06K 9/6218 |
| EP | 2650874 A1 | * | 10/2013 | ........... G10L 13/033 |
| GB | 2524505 A | * | 9/2015 | ........... G10L 13/033 |
| GB | 2501067 A | * | 10/2016 | ........... G10L 13/033 |
| JP | 2007256342 A | * | 10/2007 | ........ G06F 17/2785 |
| JP | 4745094 B2 | * | 8/2011 | ........ G06F 17/2785 |
| JP | 2017199254 A | * | 11/2017 | |
| JP | 2022060820 A | * | 4/2022 | |
| JP | 7143955 B2 | * | 9/2022 | ............. G10L 15/08 |
| JP | 2023180943 A | * | 12/2023 | |
| WO | WO-2021033233 A1 | * | 2/2021 | ............. G10L 15/08 |

* cited by examiner

✕ ··· VOICE SIGNAL

Fig. 6

601 — Confusion matrix (Grand truth rows × Estimated labels columns)

| Grand truth \ Estimated | FE_AD | FE_CH | FE_EL | MA_AD | MA_CH | MA_EL |
|---|---|---|---|---|---|---|
| FE_AD | 1417 | 549 | 917 | 0 | 172 | 1 |
| FE_CH | 283 | 1088 | 179 | 0 | 960 | 4 |
| FE_EL | 380 | 47 | 2239 | 1 | 100 | 3 |
| MA_AD | 1 | 1 | 95 | 1525 | 7 | 1332 |
| MA_CH | 41 | 725 | 259 | 17 | 1815 | 9 |
| MA_EL | 7 | 1 | 326 | 366 | 41 | 1464 |

602 — Confusion matrix (Grand truth rows × Estimated labels columns)

| Grand truth \ Estimated | FE_AD | FE_CH | FE_EL | MA_AD | MA_CH | MA_EL |
|---|---|---|---|---|---|---|
| FE_AD | 2212 | 42 | 339 | 1 | 459 | 3 |
| FE_CH | 303 | 800 | 33 | 1 | 1376 | 1 |
| FE_EL | 59 | 9 | 2656 | 3 | 37 | 6 |
| MA_AD | 0 | 0 | 5 | 2213 | 1 | 741 |
| MA_CH | 7 | 479 | 407 | 0 | 1971 | 2 |
| MA_EL | 1 | 0 | 275 | 21 | 3 | 1905 |

…

ESTIMATION DEVICE, ESTIMATION METHOD, AND ESTIMATION PROGRAM

CROSS-REFERENCE TO RELATED APPLICATIONS

This application is a U.S. National Stage Application filed under 35 U.S.C. § 371 claiming priority to International Patent Application No. PCT/JP2019/032271, filed on 19 Aug. 2019, the disclosure of which is hereby incorporated herein by reference in its entirety.

TECHNICAL FIELD

The present invention relates to an estimation apparatus, an estimation method, and an estimation program for estimating an attribute of a target person (speaker), based on a voice of the speaker.

BACKGROUND ART

In the related art, there are techniques for estimating an attribute of a speaker (speaker attribute) based on a voice of the speaker. For example, when six classes (CH-MA, CH-FE, AD-MA, AD-FE, EL-MA, and EL-FE) obtained by combining ages (child: CH, adult: AD, elderly person: EL) and genders (male: MA, female: FE) are assumed as the speaker attributes, such techniques can be used to estimate which of the above six classes the speaker belongs to. As a result, for example, it is possible to provide an interface matching the attribute of the speaker, or to mechanically support how an operator handles a call according to the attribute of the speaker at a call center or the like. Note that, NPL 1 discloses a technique for estimating a class of a speaker, by using a deep neural network (DNN) into which an acoustic feature (Mel-frequency cepstrum coefficients (MFCC) and the like) of each utterance is input.

CITATION LIST

Non Patent Literature

NPL 1: Peeah Ghahremani, Phani Sankar Nidadavolu, Nanxin Chen, Jesus Villalba, Daniel Povey, Sanjeev Khudanpur, Najim Dehak, "End-to-End Deep Neural Network Age Estimation", pp. 277-281, 2018.

SUMMARY OF THE INVENTION

Technical Problem

Here, in order to construct a model capable of robust estimation even for an unknown speaker, a large amount of training data imparted with correct speaker attributes is required. However, in many cases, such speaker attributes are not imparted to typical, easily available voice data sets for training data, and thus, it is costly to prepare a sufficient amount of training data for learning. Furthermore, if it is not possible to prepare a sufficient amount of training data, there is a problem in that the estimation accuracy of a speaker attribute for an unknown speaker decreases due to overfitting.

Thus, an object of the present invention is to solve the problem described above and to accurately estimate a speaker attribute, even if there is not a sufficient amount of training data imparted with speaker attributes.

Means for Solving the Problem

In order to solve the above-mentioned problem, there are included a clustering unit configured to cluster a group of voice signals including a voice signal having a speaker attribute to be estimated into a plurality of clusters, a cluster identification unit configured to identify, from the plurality of clusters, a cluster to which the voice signal to be estimated belongs, a first speaker attribute estimation unit configured to estimate speaker attributes of voice signals in the identified cluster, by using a speaker attribute estimation model trained for estimating a speaker attribute of a voice signal based on a feature of the voice signal, and a second speaker attribute estimation unit configured to estimate an attribute of the entire identified cluster, by using an estimation result of the speaker attributes of the voice signals in the identified cluster, and output an estimation result of the speaker attribute of the entire identified cluster, as an estimation result of the speaker attribute of the voice signal to be estimated.

Effects of the Invention

According to the present invention, it is possible to accurately estimate a speaker attribute, even if there is not a sufficient amount of training data imparted with speaker attributes.

BRIEF DESCRIPTION OF DRAWINGS

FIG. 6 are tables showing experimental results of classification of speaker attributes by the estimation apparatus according to the first embodiment.

DESCRIPTION OF EMBODIMENTS

Hereinafter, modes for carrying out the present invention (embodiments), which include a first embodiment and a second embodiment, will be separately described with reference to the drawings. An estimation apparatus of each embodiment uses, as input, a voice signal having a speaker attribute to be estimated to estimate the speaker attribute of the voice signal. Note that the present invention is not limited to the embodiments described below.

First Embodiment

Overview

Figure 1:
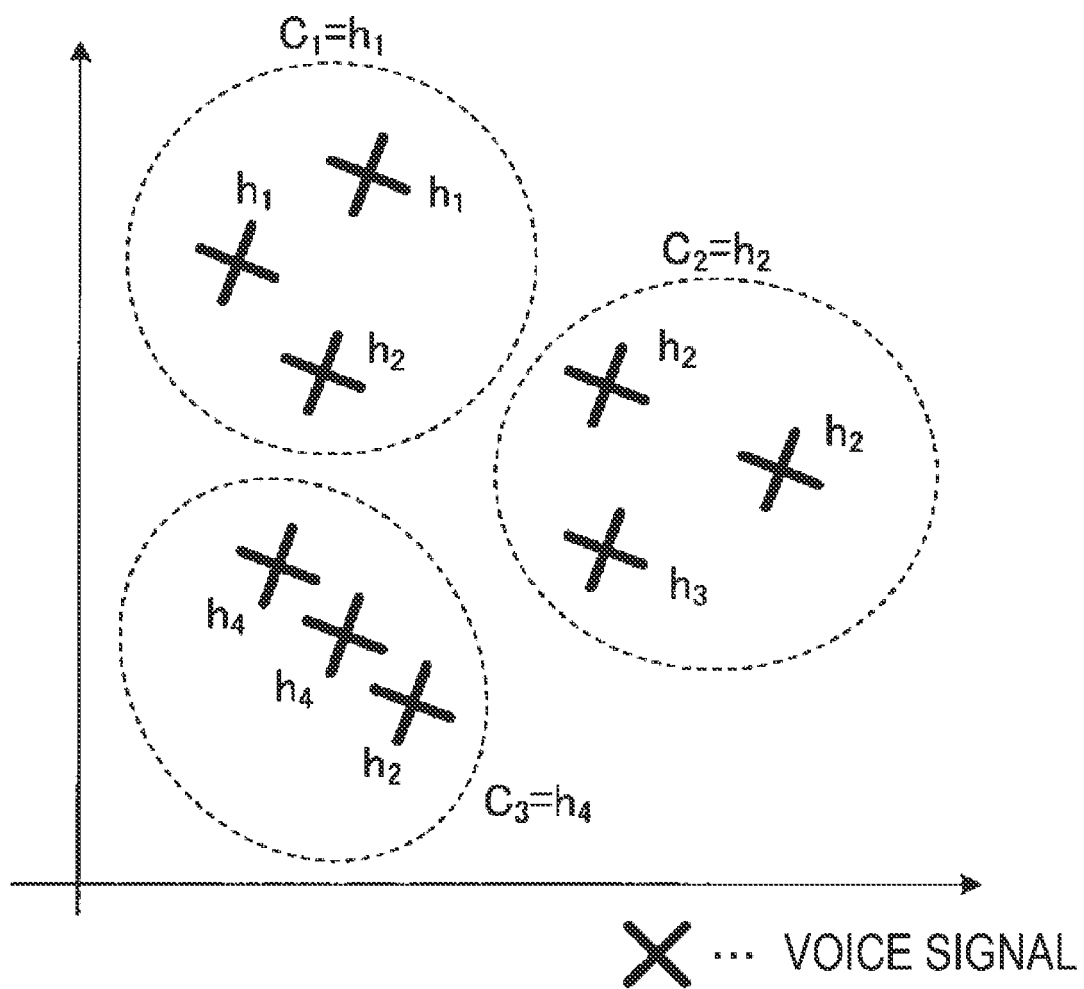
FIG. 1 is a diagram for describing an overview of an estimation apparatus according to a first embodiment.

An overview of an estimation apparatus according to the first embodiment will be described. Unlike the related art, the estimation apparatus does not estimate a speaker attribute based only, on a voice signal having a speaker attribute to be estimated (a voice signal of a target person). The estimation apparatus estimates a speaker attribute of a target person by using an estimation result of speaker attributes in a cluster to which voice signals including voice signals other than a voice signal of the target person, that is, voice signals that are not the voice signal of the target person, belong. That is, the estimation apparatus is characterized in that it estimates a speaker attribute of the target person by using an estimation result of speaker attributes of voice signals in a cluster to which the voice signal of the target person belongs (that is, voice signals similar to the voice signal of the target person). This will be described with reference to FIG. 1.

The estimation apparatus clusters, for example, a group of voice signals including the voice signal of the target person into clusters $C_1$, $C_2$, and $C_3$. Subsequently, the estimation apparatus estimates speaker attributes (for example, $h_1$ to $h_4$) of the voice signals belonging to each of the clusters $C_1$, $C_2$, and $C_3$. Here, features of the voice signals (voice features) and a trained speaker attribute estimation model (a model used for estimating speaker attributes of the voice signals on the basis of the voice features) are used to estimate the speaker attributes.

Here, the estimation apparatus estimates an attribute of the entire cluster, on the basis of an estimation result of speaker attributes of voice signals belonging to the cluster. For example, for the estimation apparatus, a case where the voice signal of the target person belongs to the cluster $C_1$ and estimation results of the speaker attributes of voice signals in the cluster $C_1$ are $h_1$, $h_1$, and $h_2$, is assumed. In this case, $h_1$ is the most common speaker attribute in the cluster $C_1$, and thus, the estimation apparatus estimates that the attribute of the entire cluster $C_1$ is $h_1$ and the speaker attribute of the voice signal of the target person is $h_1$.

That is, based on the assumption that "speakers having similar voice features are likely to be classified in the same cluster", the estimation apparatus estimates that a speaker attribute highly likely to be imparted to voice signals in the same cluster as the cluster to which the voice signal of the target person belongs is a speaker attribute of the target person.

According to such an estimation apparatus, it is possible to accurately estimate a speaker attribute, even if there is not a sufficient amount of training data imparted with speaker attributes, for example.

Configuration

Figure 2:
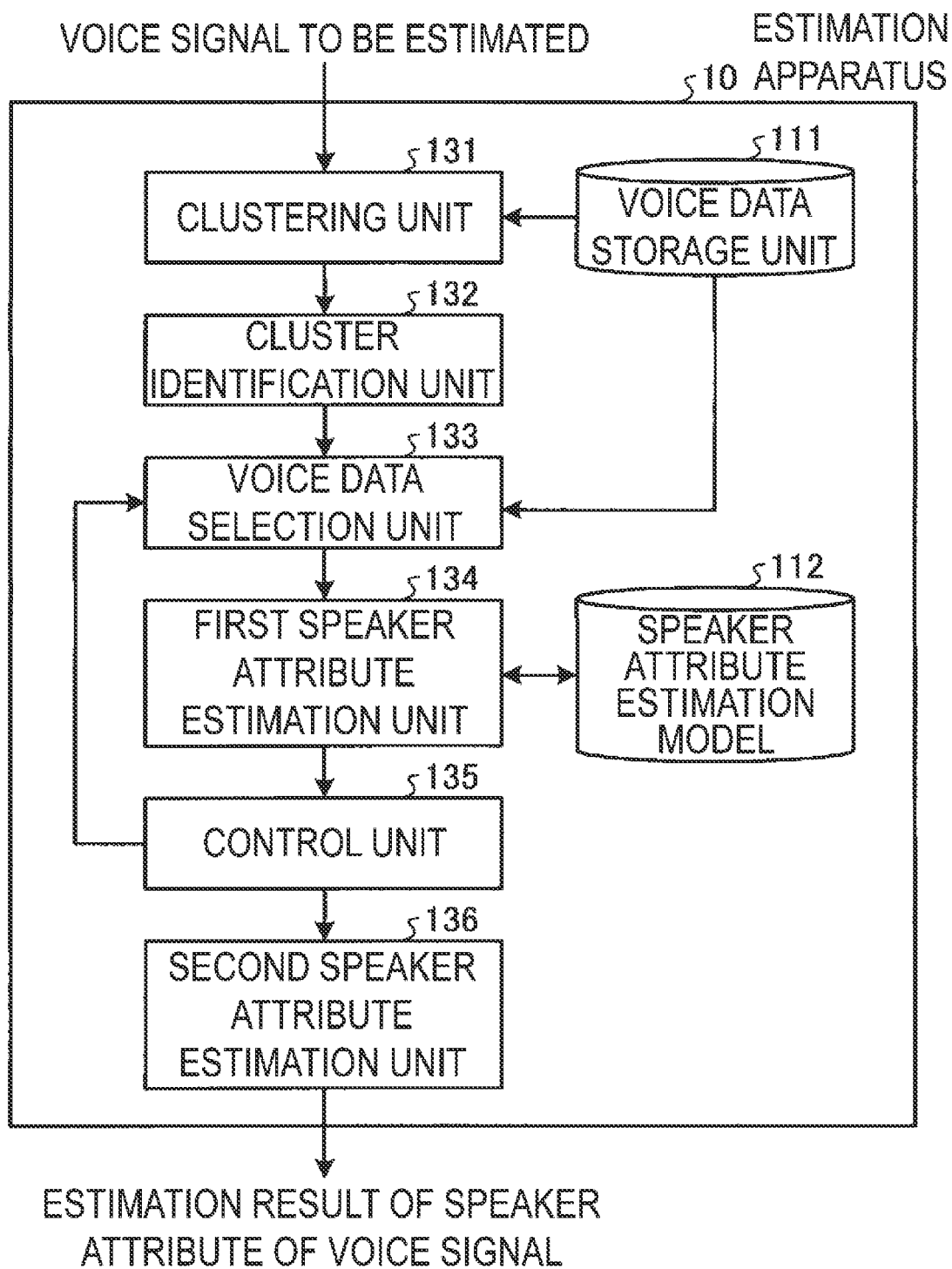
FIG. 2 is a diagram illustrating an exemplary configuration of the estimation apparatus according to the first embodiment.

Next, an exemplary configuration of an estimation apparatus 10 will be described with reference to FIG. 2, The estimation apparatus 10 includes, for example, a voice data storage unit 111, a speaker attribute estimation model 112, a clustering unit 131, a cluster identification unit 132, a voice data selection unit 133, a first speaker attribute estimation unit 134, a control unit 135, and a second speaker attribute estimation unit 136.

Voice signals of various speakers are accumulated in the voice data storage unit 111. Note that it is not necessary that a speaker attribute label be imparted to the voice signals accumulated in the voice data storage unit 111.

The speaker attribute estimation model 112 is a model for estimating a speaker attribute of a voice signal by using a feature of the voice signal as an input. It is assumed that learning of parameters based on training data has been completed in the speaker attribute estimation model 112 so that the speaker attribute estimation model 112 estimates a speaker attribute of a voice signal based on a feature of the input voice signal. The speaker attribute estimation model 112 is achieved by a neural network previously learned by using a method such as described in NPL 1, for example.

Note that the voice data storage unit 111 and the speaker attribute estimation model 11 are provided in a storage unit (not illustrated) of the estimation apparatus 10, for example. The voice data storage unit 111 and the speaker attribute estimation model 112 may be installed outside the estimation apparatus 10.

The clustering unit 131 clusters voice signals. For example, the clustering unit 131 clusters a voice signal of the target person and voice signals accumulated in the voice data storage unit ill.

For example, the clustering unit 131 extracts speaker expression vectors from the voice signal of the target person and the voice signals accumulated in the voice data storage unit 111, and clusters the speaker expression vectors by a k-means method or the like. In the extraction of the speaker expression vectors, the technique described in Literature 1 below is used, for example.

Literature 1: N Dehak, P J Kenny, R Dehak, P Dumouchel, P Ouellet, "Front-End Factor Analysis for Speaker Verification", IEEE Transactions on Audio, Speech, and Language Processing 19(4), 788-798 (2010)

The cluster identification unit 132 identifies a cluster to which the voice signal of the target person belongs (an analysis target cluster), from the clusters obtained from the clustering by the clustering unit 131.

The voice data selection unit 133 selects, from the voice signals belonging to the analysis target cluster identified by the cluster identification unit 132, one voice signal not yet subjected to speaker attribute estimation by the first speaker attribute estimation unit 134 described later.

The first speaker attribute estimation unit 134 estimates a speaker attribute of the voice signal selected by the voice data selection unit 133. Specifically, the first speaker attribute estimation unit 134 inputs the voice signal (specifically, an acoustic feature of the voice signal) selected by the voice data selection unit 133 into the speaker attribute estimation model 112, to estimate a speaker attribute of the voice signal. The first speaker attribute estimation unit 134 repeats the processing described above to estimate a speaker attribute of each voice signal belonging to the analysis target cluster.

The control unit 135 performs controls so that the first speaker attribute estimation unit 134 estimates speaker attributes of a predetermined number of voice signals belonging to the analysis target cluster identified by the cluster identification unit 132.

For example, when the voice signals belonging to the analysis target cluster identified by the cluster identification unit 132 include a voice signal not yet estimated by the first speaker attribute estimation unit 134, the control unit 135 causes the voice data selection unit 133 to select the voice signal having a speaker attribute that is not yet estimated. Furthermore, when the voice signals belonging to the analysis target cluster do not include a voice signal not yet estimated by the first speaker attribute estimation unit 134, the control unit 135 causes the second speaker attribute estimation unit 136 to execute processing.

Note that, as described below, the second speaker attribute estimation unit 136 estimates a speaker attribute of the voice signal of the target person by determining the most common speaker attribute in the estimation result of the speaker attributes of voice signals belonging to the analysis target cluster obtained by the above-described process. Thus, it is only required to obtain an estimation result of speaker attributes for a sufficient number of voice signals for determining the most common speaker attribute, among the voice signals in the analysis target cluster. Thus, when the number of voice signals belonging to the analysis target cluster is large, the control unit 135 may cause the first speaker attribute estimation unit 134 to estimate the speaker attributes of a part of the voice signals, and it is not necessary that the first speaker attribute estimation unit 134 estimates the speaker attributes of all the voice signals in the analysis target cluster.

The second speaker attribute estimation unit 136 uses the estimation result of the speaker attributes of the voice signals in the analysis target cluster estimated by the first speaker attribute estimation unit 134, to estimate the speaker attribute of the entire analysis target cluster. Subsequently, the second speaker attribute estimation unit 136 outputs an estimation result of the speaker attribute of the entire analysis target cluster as the estimation result of the speaker attribute of the voice signal of the target person.

In other words, the second speaker attribute estimation unit 136 uses the estimation result of the speaker attributes of the voice signals in the analysis target cluster estimated by the first speaker attribute estimation unit 134, to estimate a speaker attribute likely to be imparted to the voice signals in the analysis target cluster, as a speaker attribute of the voice signal of the target person.

For example, when the second speaker attribute estimation unit 136 estimates and outputs one speaker attribute highly likely to be imparted to the voice signal of the target person, the second speaker attribute estimation unit 136 determines that the most common speaker attribute of the speaker attributes imparted to the voice signals in the analysis target cluster is the speaker attribute of the voice signal of the target person.

Alternatively, when the second speaker attribute estimation unit 136 outputs a probability that each speaker attribute is the speaker attribute of the voice signal of the target person, the second speaker attribute estimation unit 136 determines, based on a result obtained by summing up probabilities of the speaker attributes of the voice signals in the analysis target cluster, that a speaker attribute having the highest probability is the speaker attribute of the voice signal of the target person.

Processing Procedure

Figure 3:
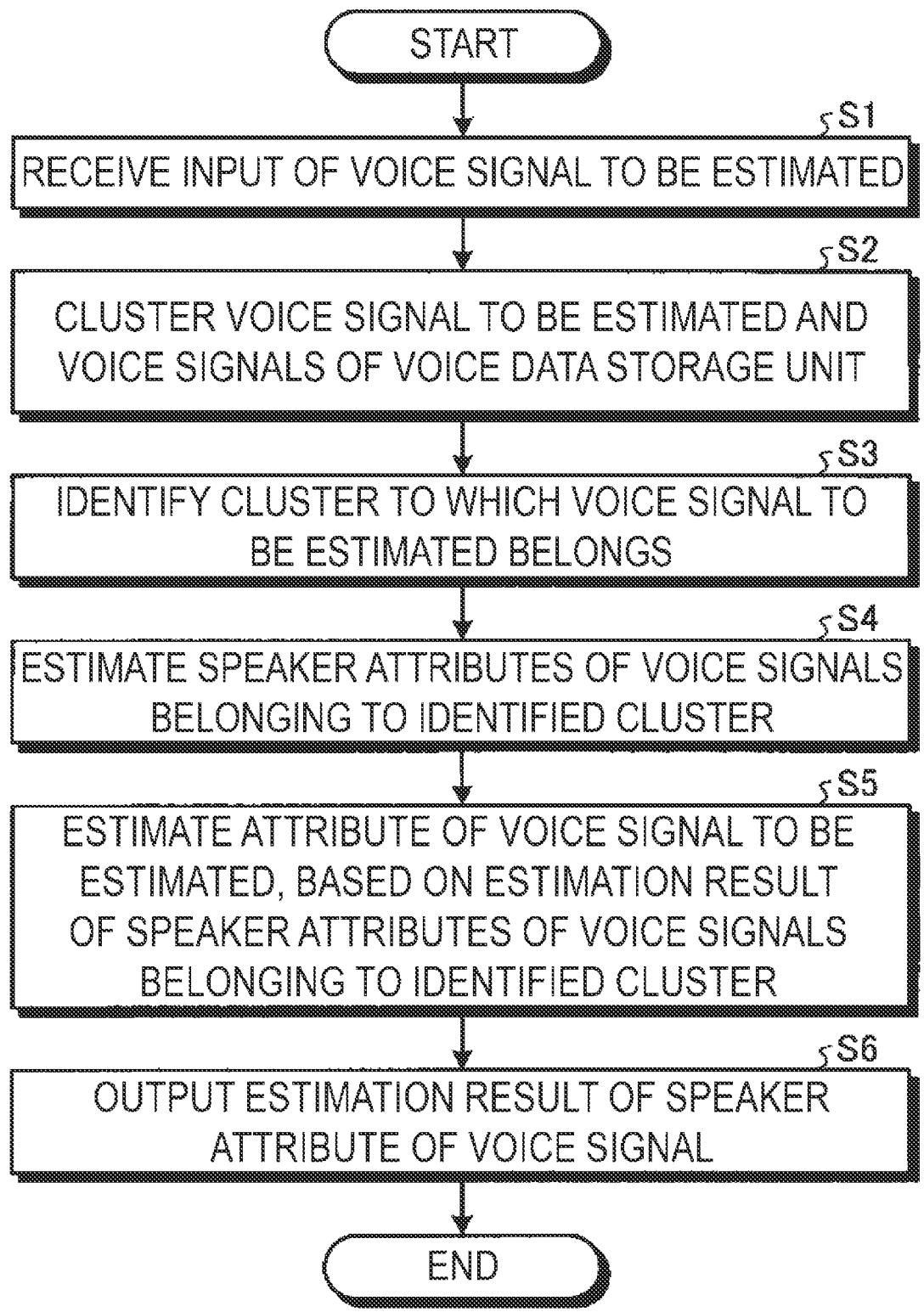
FIG. 3 is a flowchart illustrating an example of a processing procedure of the estimation apparatus according to the first embodiment.

Next, an example of a processing procedure of the estimation apparatus 10 will be described with reference to FIG. 3. First, when the estimation apparatus 10 receives an input of a voice signal of the target person (voice signal to be estimated) (S1), the clustering unit 131 clusters the voice signal to be estimated and voice signals of the voice data storage unit 111 (S2). Subsequently, the cluster identification unit 132 identifies a cluster to which the voice signal to be estimated belongs (the analysis target cluster) (S3).

After S3, the first speaker attribute estimation unit 134 uses the speaker attribute estimation model 112 to estimate speaker attributes of voice signals belonging to the cluster (analysis target cluster) identified in S3 (S4). Subsequently, the second speaker attribute estimation unit 136 estimates a speaker attribute of the voice signal to be estimated, based on an estimation result of the speaker attributes of the voice signals belonging to the cluster (analysis target cluster) identified in S3 (S5). That is, based on the estimation result of the speaker attribute of each voice signal belonging to the analysis target cluster, the second speaker attribute estimation unit 136 estimates a speaker attribute likely to be imparted to the voice signals in the analysis target cluster. Subsequently, the second speaker attribute estimation unit 136 estimates an attribute likely to be imparted to the voice signals in the analysis target cluster, as the speaker attribute of the voice signal to be estimated. After that, the second speaker attribute estimation unit 136 outputs an estimation result of the speaker attribute of the voice signal to be estimated (S6).

Thus, the estimation apparatus 10 can accurately estimate the speaker attribute of the voice signal, even if there is not a sufficient amount of training data imparted with speaker attributes.

Note that, when the first speaker attribute estimation unit 134 and the speaker attribute estimation model 112 of the estimation apparatus 10 are achieved by a neural network, the first speaker attribute estimation unit 134 performs the processing such as described below.

For example, when voice features for 21 frames obtained by combining 10 frames before and after a certain frame are input to the neural network mentioned above, the neural network outputs a vector having the same number of dimensions as the number of speaker attributes (the number of classes), via one convolution layer and four fully connected layers. Note that, in the following description, layers of the neural network will be referred to as a first layer, a second layer, and so forth, starting from a lowest layer.

For example, in the first layer of the neural network being a convolution layer, 10 frames before and after a central frame are input and converted into a 512-dimensional vector, and the converted vector is output. Furthermore, in the second to fourth layers of the neural network, the 512-dimensional vector output from the lower layer is converted into a 512-dimensional vector by fully connected layers, and the converted vector is output. Moreover, in the fifth layer of the neural network, the 512-dimensional vector output from the fourth layer is converted by a fully connected layer, and a six-dimensional vector, having the same number of dimensions as the number of classes, is output.

Furthermore, in the sixth layer of the neural network, the six-dimensional vector obtained from the fifth layer for each 21 frames is averaged for each utterance, and afterwards, a softmax loss with respect to a correct class label is calculated, thereby classification into six classes is performed for each utterance.

Second Embodiment

Overview

An overview of an estimation apparatus 10a according to the second embodiment will be described. Configurations that are the same as those in the first embodiment are denoted with the same reference signs, and the description thereof will be omitted. The estimation apparatus 10a according to the second embodiment estimates speaker attributes of a plurality of voice signals (a set of voice signals). Note that an estimation result of the speaker attributes of the set of voice signals estimated by the estimation apparatus 10a may be utilized, for example, for another analysis processing, or may be used as training data in training a model in another AI.

Configuration

Figure 4:
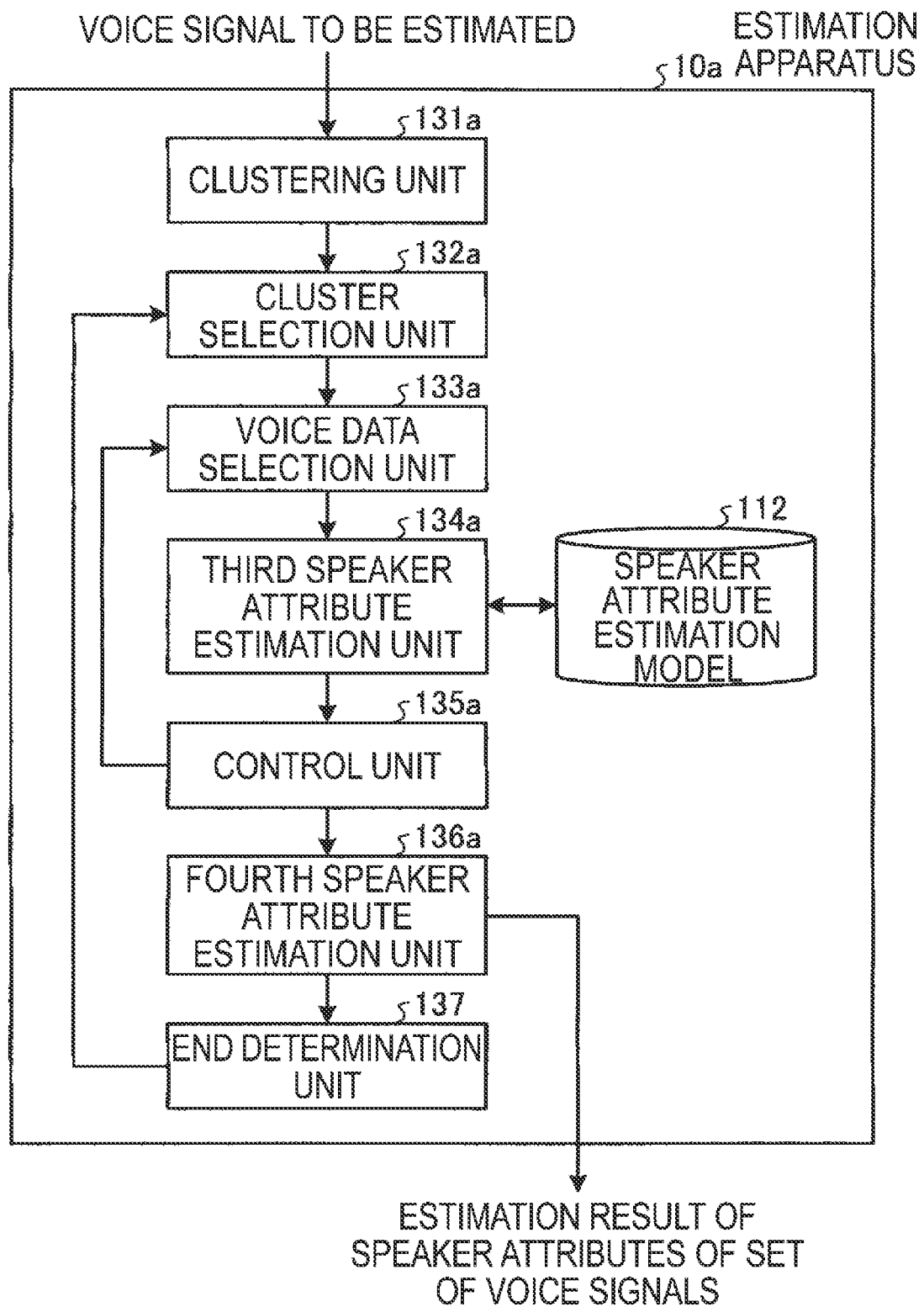
FIG. 4 is a diagram illustrating an exemplary configuration of an estimation apparatus according to a second embodiment.

An exemplary configuration of the estimation apparatus 10a will be described with reference to FIG. 4. The estimation apparatus 10a includes, for example, a clustering unit 131a, a cluster selection unit 132a, a voice data selection unit 133a, a third speaker attribute estimation unit 134a, a control unit 135a, a fourth speaker attribute estimation unit 136a, and an end determination unit 137.

The clustering unit 131a clusters the set of voice signals to be estimated into a plurality of clusters. The clustering method is similar to that of the clustering unit 131 described in the first embodiment.

The cluster selection unit 132a selects, from the plurality of clusters obtained by the clustering by the clustering unit 131a, one cluster (unprocessed cluster) not yet subjected to speaker attribute estimation by processing described later.

The voice data selection unit 133a selects, from the voice signals belonging to the cluster selected by the cluster selection unit 132a, one voice signal not yet subjected to speaker attribute estimation by the third speaker attribute estimation unit 134a described later.

As in the first embodiment, the third speaker attribute estimation unit 134a estimates the speaker attribute of the voice signal selected by the voice data selection unit 133a. Specifically, the third speaker attribute estimation unit 134 inputs the voice signal (an acoustic feature) selected by the voice data selection unit 133a into the speaker attribute estimation model 112, to obtain an estimation result of the speaker attribute of the voice signal. The third speaker attribute estimation unit 134a repeats the above-described processing to estimate speaker attributes of voice signals in each cluster of the set of voice signals to be estimated.

The control unit 135a performs control so that the third speaker attribute estimation unit 134a estimates speaker attributes of a predetermined number of voice signals belonging to the cluster selected by the cluster selection unit 132a.

For example, when the voice signals belonging to the cluster selected by the cluster selection unit 132a include a voice signal not yet estimated by the third speaker attribute estimation unit 134a, the control unit 135a causes the voice data selection unit 133a to select the voice signal.

The fourth speaker attribute estimation unit 136a estimates and outputs a speaker attribute of the cluster selected by the cluster selection unit 132a. That is, the fourth speaker attribute estimation unit 136a estimates a speaker attribute of an entire cluster selected by the cluster selection unit 132a from the plurality of clusters obtained by the clustering unit 131a by using an estimation result of the speaker attributes of the voice signals in the cluster. The fourth speaker attribute estimation unit 136a repeats the above-described processing to obtain an estimation result of a speaker attribute for each of the plurality of clusters. Subsequently, the fourth speaker attribute estimation unit 136a outputs the estimation results of the speaker attributes of the plurality of clusters mentioned above, as estimation results of the speaker attributes of the set of voice signals to be estimated.

For example, when the fourth speaker attribute estimation unit 136a determines and outputs one speaker attribute highly likely to be imparted to the voice signal to be estimated, the fourth speaker attribute estimation unit 136a determines that the most common speaker attribute of the speaker attributes imparted to the voice signals in the cluster is the speaker attribute of the cluster.

Alternatively, when the fourth speaker attribute estimation unit 136a outputs a probability that each speaker attribute is the speaker attribute of the voice signal to be estimated, the fourth speaker attribute estimation unit 136a sums up probabilities of the voice signals in the cluster, and determine that a speaker attribute having the highest probability is the speaker attribute of the cluster.

The end determination unit 137 determines whether or not the estimation results by the fourth speaker attribute estimation unit 136a are obtained for all the clusters obtained by the clustering unit 131a. Here, when the end determination unit 137 determines that the estimation result by the fourth speaker attribute estimation unit 136a is not yet obtained for any one of the clusters, the cluster selection unit 132a selects an unprocessed cluster.

Figure 5:
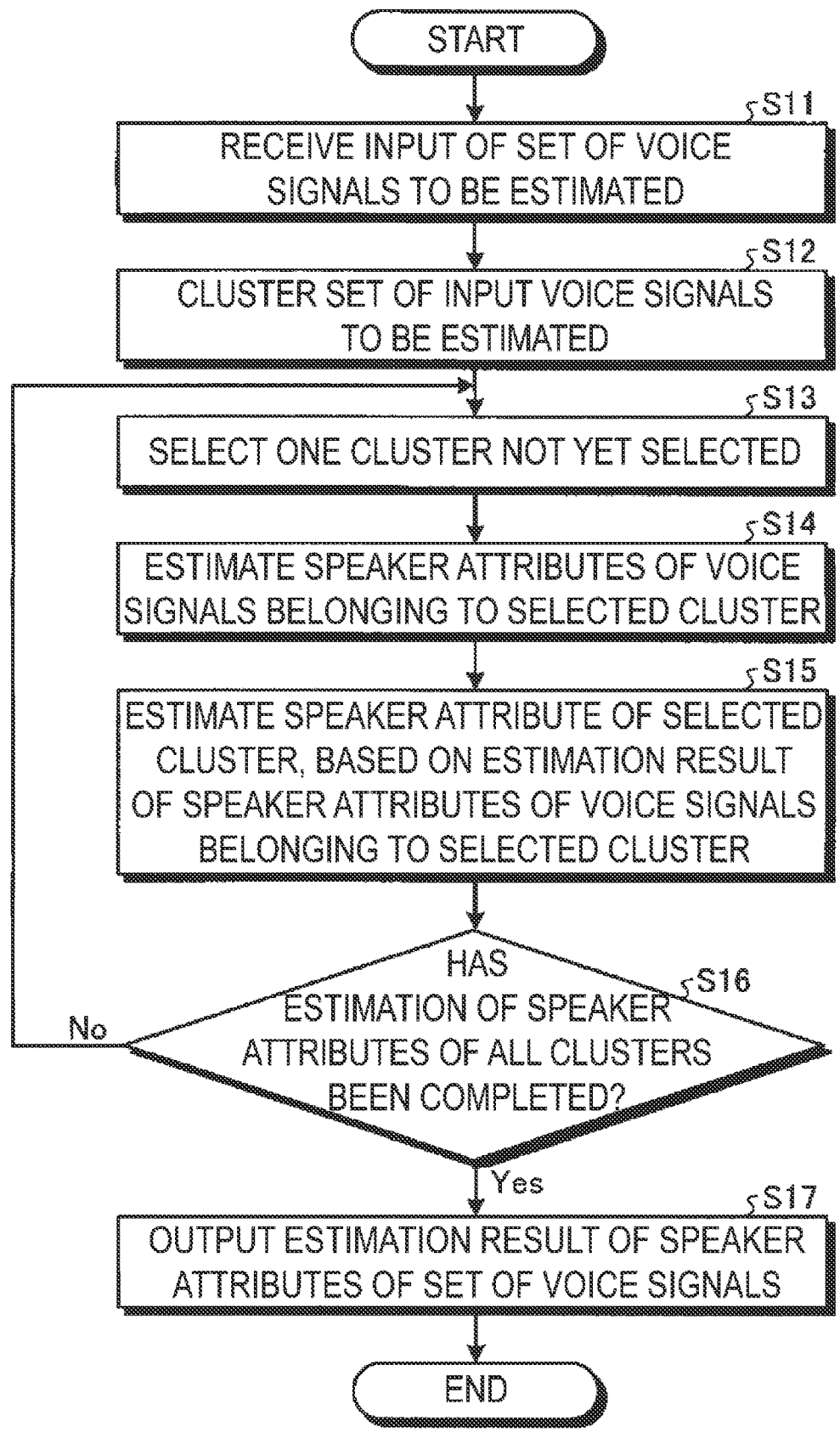
FIG. 5 is a flowchart illustrating an example of a processing procedure of the estimation apparatus according to the second embodiment.

Processing Procedure Next, an example of a processing procedure of the estimation apparatus 10a will be described with reference to FIG. 5. First, when the estimation apparatus 10a receives an input of a set of voice signals to be estimated (S11), the clustering unit 131a clusters the input set of voice signals to be estimated (S12). Subsequently, the cluster selection unit 132a selects one cluster that is not yet selected, from the clusters obtained in the clustering of S12 (S13). Next, the third speaker attribute estimation unit 134a uses the speaker attribute estimation model 112 to estimate speaker attributes of the voice signals belonging to the cluster selected in S13 (S14). Subsequently, the fourth speaker attribute estimation unit 136a estimates a speaker attribute of the cluster, based on an estimation result of the speaker attributes of the voice signals belonging to the cluster selected in S13 (S15). That is, based on the estimation result of the speaker attribute of each voice signal belonging to the cluster, the fourth speaker attribute estimation unit 136a estimates a speaker attribute that is likely to be imparted to the voice signals in the cluster. After that, the end determination unit 137 determines whether or not the estimation of the speaker attributes of all the clusters has been completed (S16). When the end determination unit 137 determines that the estimation of the speaker attributes of all the clusters has been completed (Yes in S16), the fourth speaker attribute estimation unit 136a outputs the estimation result of the speaker attributes of the set of voice signals (S17). On the other hand, when the end determination unit 137 determines that there is a cluster for which the estimation of the speaker attributes has not been completed (No in S16), the processing returns to the processing of S13.

Thus, the estimation apparatus 10a can accurately estimate the speaker attributes of a set of voice signals.

Experimental Results

Next, experimental results of estimating speaker attributes of voice signals by the estimation apparatus 10 according to the present embodiment will be described.

First, conditions of the experiment mentioned above will be described. Here, a voice utterance corpus obtained by independently collecting voice samples that 140 male and female speakers read aloud, was used as voice signals imparted with age and gender information.

The average utterance length for each utterance was about 3 seconds, and the average number of utterances per speaker was 504 in the voice utterance corpus. 20-dimensional Mel-frequency cepstrum coefficients (MFCC) at a window width of 20 milliseconds were calculated for the voices recorded at a sampling frequency of 16000 Hz and at a quantization bit rate of 16 bits. Short-term cepstrum mean normalization was performed to remove channel effects. Furthermore, sample sets of 50, 48, and 42 speakers were extracted without duplication of speakers, and these sample sets were respectively used as a training set, a development set, and an evaluation set. The number of speakers included in each age and gender class was the same. Furthermore, the average accuracy for each class was used as an evaluation scale.

In order to calculate an i-vector used for the clustering of speakers, a 128 mixed universal background model, a 400-dimensional total variance matrix, and a 150-dimensional linear discriminant analysis of the speakers were trained by using all speeches of the Corpus of Spontaneous Japanese.

Here, in order to perform ensemble learning using a plurality of different models, two types of DNNs, a DNN optimized by a stochastic gradient dissent (SGD) method at a learning rate of 0.01, and a DNN optimized by the Adam method at a learning rate of 0.1, were constructed. In order to prevent overfitting, the upper limits of the numbers of epochs during learning for the respective DNNs were 100 and 20, and the model having the best classification accuracy for the development set was selected.

Furthermore, when a model in which the two models trained by the SGD method and the Adam method mentioned above were combined at the score level (hereinafter, referred to as "fusion" as appropriate) was used to classify the voice utterance corpus mentioned above into age and gender classes, the accuracy (accuracy) of the classification was 0.59.

On the other hand, in a case where, for example, after the voice signals of the voice utterance corpus were clustered, the speaker attributes of the voice signals in each cluster were estimated by the above-mentioned fusion, the most common speaker attribute of the speaker attributes of the voice signals in each cluster was used as the speaker attribute of the cluster (an intra-cluster voting was performed), and the above-mentioned voice utterance corpus was classified into age and gender classes, as in the estimation apparatus of the present embodiment, the accuracy (accuracy) in the classification of the voice utterance corpus was improved to 0.72.

FIG. 6 shows confusion matrices of each age and gender class (CH-MA, CH-FE, AD-MA, AD-FE, EL-MA, and EL-FE). The vertical axis of the confusion matrices shown in FIG. 6 represents a grand truth (correct answer) of the age and gender classes, and the horizontal axis represents estimated labels (classification results) of the age and gender classes. Reference numeral 601 in FIG. 6 indicates results of classifying the voice utterance corpus into age and gender classes, without performing the intra-cluster voting mentioned above. Reference numeral 602 in FIG. 6 indicates results obtained by performing the above-mentioned intra-cluster voting to classify the voice utterance corpus into age and gender classes, as in the estimation apparatus 10 of the present embodiment. In both cases, the above-mentioned fusion was used as a model. As shown in FIG. 6, it was confirmed that the classification accuracy of each age and gender class was improved when performing the above-mentioned intra-cluster voting, as in the estimation apparatus 10 of the present embodiment.

Program

In addition, a, program implementing the functions of the estimation apparatuses 10 and 10a described in the aforementioned embodiments may be installed into a desired information processing apparatus (computer), so that these functions can be implemented. For example, by causing an information processing apparatus to execute the above-described program provided as package software or online software, the information processing apparatus can function as the estimation apparatuses 10 and 10a. The information processing apparatus described here includes a desktop or laptop personal computer, a rack-mount type server computer, and the like. Additionally, the information processing apparatus includes a mobile communication terminal such as a smartphone, a mobile phone, and a personal handyphone system (PHS), as well as personal digital assistant (PDA). Moreover, the estimation apparatuses 10 and 10a may be implemented in a cloud server.

Figure 7:
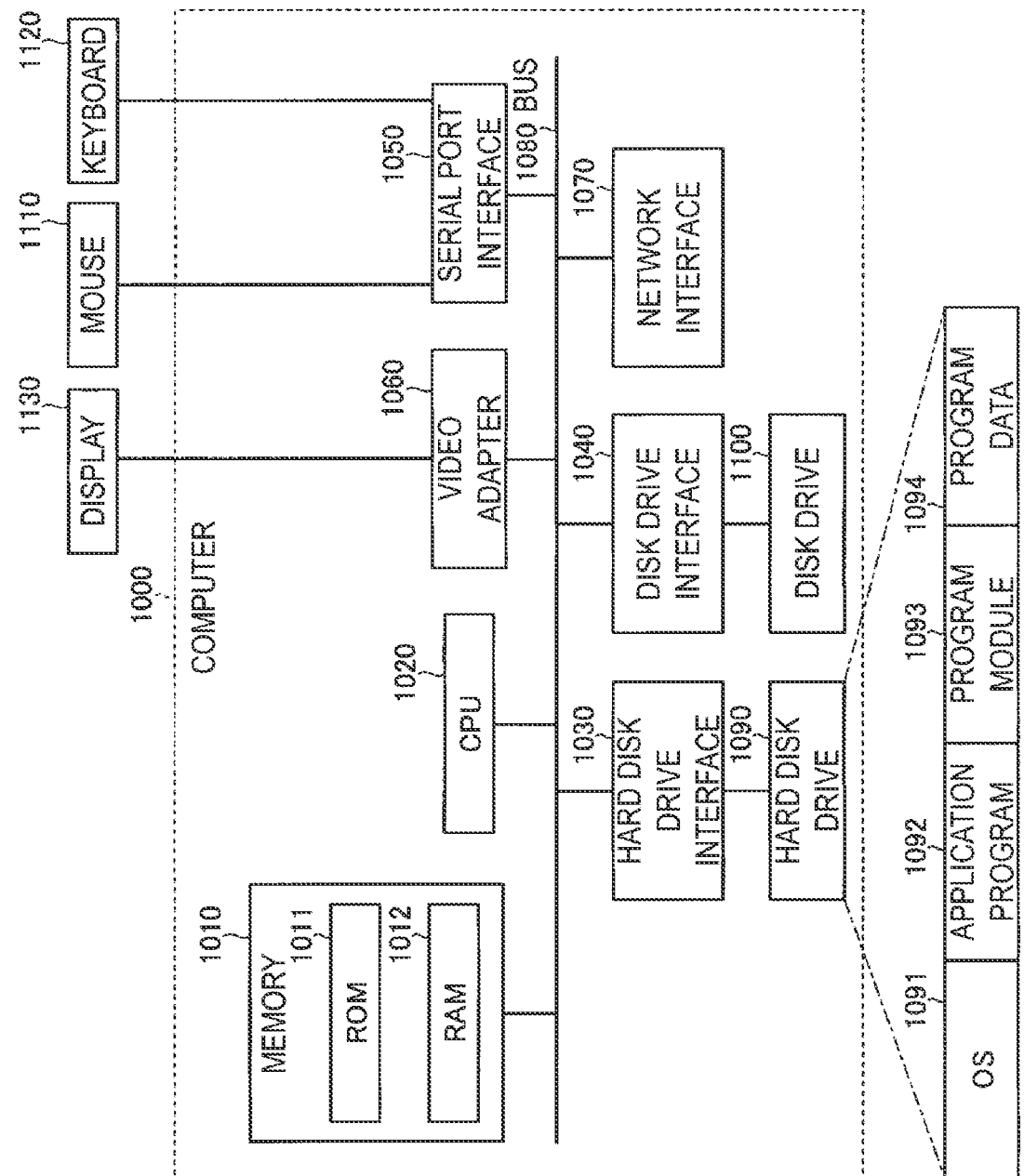
FIG. 7 is a diagram illustrating an example of a computer that executes an estimation program.

An example of a computer that executes the program (the estimation program) described above will be described with reference to FIG. 7. As illustrated in FIG. 7, a computer 1000 includes, tier example, a memory 1010, a CPU 1020, a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a random access memory (RAM) 1012. The ROM 1011 stores a boot program such as, for example, a basic input output system (BIOS). The hard disk drive interface 1030 is connected to a hard disk drive 1090. The disk drive interface 1040 is connected to a disk drive 1100. A removable storage medium such as a magnetic disk or an optical disk is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094 as illustrated in FIG. 7. The voice data recording unit 111 and the speaker attribute estimation model 112 described in the aforementioned embodiments are implemented in the hard disk drive 1090 and the memory 1010, for example.

The CPU 1020 reads the program module 1093 and the program data 1094, stored in the hard disk drive 1090, onto the RAM 1012 as needed, and executes each of the aforementioned procedures.

Note that the program module 1093 and the program data 1094 related to the estimation program described above are not necessarily stored in the hard disk drive 1090, and may be stored in a removable storage medium and read by the CPU 1020 via the disk drive 1100, for example. Alternatively, the program module 1093 and the program data 1094 related to the program described above may be stored in another computer connected via a network such as a LAN or a wide area network (WAN), and may be read by the CPU 1020 via the network interface 1070.

REFERENCE SIGNS LIST 10, 10a, Estimation apparatus
111 Voice data storage unit
112 Speaker attribute estimation model
131, 131a Clustering unit
132 Cluster identification unit
132a Cluster selection unit
133, 133a Voice data selection unit
134 First speaker attribute estimation unit
134a Third speaker attribute estimation unit
135, 135a Control unit
136 Second speaker attribute estimation unit
136a Fourth speaker attribute estimation unit
137 End determination unit

The invention claimed is:

1. An estimation apparatus, configured to:
cluster a group of voice signals including a voice signal having a speaker attribute to be estimated into a plurality of clusters;
identify, from the plurality of clusters, a cluster to which the voice signal to be estimated belongs;
estimate speaker attributes of voice signals in the identified cluster, by using a speaker attribute estimation model trained for estimating a speaker attribute of a voice signal based on a feature of the voice signal; and
estimate an attribute of the entire identified cluster, by using an estimation result of the speaker attributes of the voice signals in the identified cluster, and output an estimation result of the speaker attribute of the entire identified cluster, as an estimation result of the speaker attribute of the voice signal to be estimated.

2. The estimation apparatus according to claim 1, further configured to:
   determines that a most common speaker attribute in the identified cluster is the estimation result of the speaker attribute of the entire identified cluster, based on the estimation result of the speaker attributes of the voice signals in the identified cluster.

3. The estimation apparatus according to claim 1, further configured to:
   calculate, when estimating the speaker attributes of the voice signals, for each of the speaker attributes of the voice signals, a probability that the speaker attribute of the voice signal is each speaker attribute, and
   sum up probabilities of the speaker attributes of the voice signals belonging to the identified cluster and determine that a speaker attribute having a highest probability is the estimation result of the speaker attribute of the entire identified cluster.

4. The estimation apparatus according to claim 1, further configured to:
   use a neural network to estimate the speaker attribute of the voice signal to be estimated.

5. An estimation method executed by an estimation apparatus, the estimation method comprising:
   clustering a group of voice signals including a voice signal having a speaker attribute to be estimated into a plurality of clusters;
   identifying, from the plurality of clusters, a cluster to which the voice signal to be estimated belongs;
   estimating speaker attributes of voice signals in the identified cluster, by using a speaker attribute estimation model trained for estimating a speaker attribute of a voice signal based on a feature of the voice signal; and
   estimating a speaker attribute of the entire identified cluster, by using an estimation result of the speaker attributes of the voice signals in the identified cluster, and outputting an estimation result of the speaker attribute of the entire identified cluster, as an estimation result of the speaker attribute of the voice signal to be estimated.

6. The estimation method according to claim 5, further comprising:
   determining that a most common speaker attribute in the identified cluster is the estimation result of the speaker attribute of the entire identified cluster, based on the estimation result of the speaker attributes of the voice signals in the identified cluster.

7. The estimation method according to claim 5, further comprising:
   calculating, when estimating the speaker attributes of the voice signals, for each of the speaker attributes of the voice signals, a probability that the speaker attribute of the voice signal is each speaker attribute, and
   summing up probabilities of the speaker attributes of the voice signals belonging to the identified cluster and determine that a speaker attribute having a highest probability is the estimation result of the speaker attribute of the entire identified cluster.

8. The estimation method according to claim 5, further comprising:
   estimating the speaker attributes using a neural network.

9. A non-transitory computer-readable recording medium having computer-readable instructions stored thereon, which when executed, causes a computer to execute a process comprising:
   clustering a group of voice signals including a voice signal having a speaker attribute to be estimated into a plurality of clusters;
   identifying, from the plurality of clusters, a cluster to which the voice signal to be estimated belongs;
   estimating speaker attributes of voice signals in the identified cluster, by using a speaker attribute estimation model trained for estimating a speaker attribute of a voice signal based on a feature of the voice signal; and
   estimating a speaker attribute of the entire identified cluster, by using an estimation result of the speaker attributes of the voice signals in the identified cluster, and outputting an estimation result of the speaker attribute of the entire identified cluster, as an estimation result of the speaker attribute of the voice signal to be estimated.

10. The computer readable medium according to claim 9, wherein the process further comprises:
    determining that a most common speaker attribute in the identified cluster is the estimation result of the speaker attribute of the entire identified cluster, based on the estimation result of the speaker attributes of the voice signals in the identified cluster.

11. The computer readable medium according to claim 9, wherein the process further comprises:
    calculating, when estimating the speaker attributes of the voice signals, for each of the speaker attributes of the voice signals, a probability that the speaker attribute of the voice signal is each speaker attribute, and
    summing up probabilities of the speaker attributes of the voice signals belonging to the identified cluster and determine that a speaker attribute having a highest probability is the estimation result of the speaker attribute of the entire identified cluster.

* * * * *